(12) United States Patent
Plüschow et al.

(10) Patent No.: US 6,319,163 B1
(45) Date of Patent: Nov. 20, 2001

(54) TRANSPORT DEVICE IN A PACKAGING MACHINE

(75) Inventors: Dieter Plüschow, Stutensee; Walter Dreizler, Minfeld, both of (DE)

(73) Assignee: IWK Verpackungstechnik GmbH, Stutensee (DE)

( * ) Notice: Subject to any disclaimer, the term of this patent is extended or adjusted under 35 U.S.C. 154(b) by 0 days.

(21) Appl. No.: 09/165,198

(22) Filed: Oct. 2, 1998

(30) Foreign Application Priority Data

Oct. 8, 1997 (DE) .............................. 197 44 416

(51) Int. Cl.[7] .............................. F16H 59/00; F16H 61/06
(52) U.S. Cl. .............................. 474/77; 474/78; 474/113
(58) Field of Search .............................. 474/108, 73, 74, 474/28, 103, 109, 77, 78, 113

(56) References Cited

U.S. PATENT DOCUMENTS

| | | | |
|---|---|---|---|
| 1,250,903 | * 12/1917 | Kyle | 474/4 |
| 2,169,089 | * 8/1939 | Davenport | 474/4 |
| 2,474,789 | * 6/1949 | Perhacs | 192/93 C |
| 2,878,690 | * 3/1959 | Capron et al. | 474/28 B |
| 3,077,845 | * 2/1963 | Bono | 474/73 |

FOREIGN PATENT DOCUMENTS 4314632   12/1996   (DE) .

* cited by examiner

*Primary Examiner*—David A. Bucci
*Assistant Examiner*—Marcus Charles
(74) *Attorney, Agent, or Firm*—Paul Vincent

(57) ABSTRACT

A transport device in a packaging machine includes a plurality of circulating transport chains which each travel over at least one chain wheel. In order to be able to adjust the transport device to differing formats for the bulk product and/or the packaging, the chain wheels can be adjusted with respect to each other in a peripheral direction upon a support shaft. In order to effect as simple and compact a construction as possible, a hydraulic fastening device is provided for fixing the chain wheels relative to each other, wherein the fastening device can be deactivated by means of a releasing device to effect adjustment. The chain wheels can be radially fixed to the shaft by the hydraulic fastening device. It is however also possible for the chain wheels to be disposed on coaxial shaft members which can be adjusted with respect to each other in the peripheral direction and which can be fixed to each other by the hydraulic fastening device.

20 Claims, 3 Drawing Sheets

TRANSPORT DEVICE IN A PACKAGING MACHINE

This application claims Paris Convention Priority of German patent application number 197 44 416.4 filed Oct. 8, 1997 the complete disclosure of which is hereby incorporated by reference.

BACKGROUND OF THE INVENTION

The invention concerns a transport device in a packaging machine having a plurality of circulating endless transport members which each travel via at least one drive wheel, wherein the drive wheels can be adjusted relative to each other in the peripheral direction upon a supporting shaft.

In a packaging machine, in particular in a cartoning machine for folded containers, differing transport members, e.g. in the form of transport chains, are provided for in order to transport the bulk product, i.e. the product to be packaged, the folded containers and, if appropriate, the brochures accompanying the packaging through the machine. Towards this end it is important for the function and the efficiency of the packaging machine that the relative motion of the chains with respect to each other be precisely tuned. This is generally achieved through the precise alignment of chain wheels of the respective chains on a common shaft.

Transport means can also be utilized comprising toothed belts instead of chains and having associated drive wheels in the form of pulleys. These transport means are explicitly included within the purview of the invention.

When the packaging machine is reconfigured to adapt to a different type and amount of bulk product and associated folded container, the drive wheels must be newly aligned with respect to each other on the common shaft. Towards this end one has, in the past, held at least one drive wheel on the shaft in a detachable fashion using a screw clamp arrangement so that, after loosening of the clamping screw, a manual adjustment of the drive wheel in the peripheral direction, i.e. a rotation of the drive wheel is possible. After the drive wheel has been adjusted to the desired rotational position, it is once more fixed to the shaft by tightening the clamping screw. This procedure is time consuming and relatively imprecise.

In a conventional arrangement disclosed in DE 43 14 632 C2, each adjustable chain wheel (disposed on a central shaft in a freely rotating fashion) has its own coaxial toothed wheel in engagement with a drive toothed wheel seating on a secondary shaft disposed parallel to the central shaft, wherein the central shaft and the secondary shaft can be synchronously driven by means of a linkage. The linkage driving both shafts comprises a drive wheel seating in a rotationally secure fashion on the central shaft as well as a drive wheel seated for rotation on the secondary shaft and having a pneumatic clutch. When the clutch is activated, a coupling bushing is also activated which fixes the secondary shaft with the drive wheel borne thereon in a rotationally secure fashion. In order to adjust the chain wheels, the secondary shaft can be decoupled from the drive using the clutch, to permit relative motion of the chain wheels via the drive. The amount of constructive effort required by this device is however quite extensive. In particular, the secondary shaft and additional drive require a substantial amount of space within the packaging machine.

It is the underlying purpose of the invention to create a transport device in a packaging machine of the above mentioned kind with which the relative adjustment of the drive wheels is facilitated in a simple and precise fashion and requiring only a small amount of space.

SUMMARY OF THE INVENTION

This purpose is achieved in accordance with the invention by a transport device of this kind via a hydraulic fastening device to fix the drive wheels relative to each other and with a releasing device to deactivate the fastening device.

The drive wheels can either be chain wheels or pulleys, wherein the transport means are formed accordingly from chains or toothed belts.

In a preferred embodiment, the drive wheels are disposed on a common continuous shaft, wherein at least one of the drive wheels can be fixed radially on the shaft by means of a hydraulic fastening device. In order to adjust the drive wheels relative to each other it is thereby only necessary to decrease the hydraulic pressure of the fastening device to a sufficient extent that the connection or pressure between the drive wheel and the shaft is relieved. The relative adjustment of the drive wheels can then be effected by means of the central drive of the packaging machine to rotate the shaft. The released drive wheel thereby remains stationary to effect relative motion. In this manner, no additional drive device is required for the adjustment so that the constructive effort is accordingly simplified.

Instead of radially fixing the adjustable drive wheel to the shaft by means of the hydraulic fixing device, an alternative embodiment provides that the drive wheels are disposed on coaxially disposed shaft members which can be fixed relative to each other by means of the hydraulic fixing device and, after release of the fixing mechanism, can be adjusted in the peripheral direction relative to each other. The adjustment of the coaxial shaft members is associated with the relative adjustment of the drive wheels located respectively thereon as result of which a format adjustment is achieved. Also in this case the central drive of the machine can be utilized for the adjustment having, if appropriate, manual or motor drive forces acting thereon.

In a preferred embodiment of the invention, the hydraulic fixing device comprises a pressure loaded piston and a hydraulic channel feeding into a pressure chamber, wherein the pressure chamber has an associated fixing element which can be pressed against the shaft via the pressure reigning in the pressure chamber. Displacement of the piston leads to changes in the hydraulic pressure in the hydraulic channel in a conventional manner. A particularly simple constructive configuration results when the piston is loaded by a spring determining the hydraulic pressure and thereby the required fixing force.

If the adjustable drive wheel is directly fixed radially to the shaft, the pressure chamber should be fashioned in the drive wheel. When two coaxially disposed shaft members are to be fixed by the hydraulic fixing device it is possible, in a preferred embodiment of the invention, for an adapter sleeve to be mounted to one of the shaft members into which the other shaft member is inserted for rotation. The pressure chamber is formed in the adapter sleeve so that the adapter sleeve can be firmly connected to the inserted shaft member at appropriate hydraulic pressures.

An improvement of the invention provides that the adapter sleeve simultaneously supports the drive wheel to keep constructive effort low.

The fixing forces can be introduced onto the shaft or the shaft member in a point-like fashion, wherein a plurality of fixing points are then preferentially provided about the periphery of the shaft. It has turned out to be particularly advantageous if the pressure chamber is a ring chamber surrounding the shaft to effect an even radially inwardly directed pressure about the girth of the shaft. A seating over a wide area and an even introduction of the fixing forces can thereby be effected if a membrane is disposed between the pressure chamber and the surface of the shaft which seats on the outer surface of the shaft at high hydraulic pressures.

In principle, the hydraulic channel can extend in an arbitrary fashion between the piston determining the hydraulic pressure and the pressure chamber. In particular, conduits leading to the pressure chamber can e.g. also be provided. This is a particularly compact solution insensitive to external influences having, however, the hydraulic channel traveling axially within the shaft, wherein the spring can then also be disposed in a spring chamber formed in the shaft.

When the adjustable drive wheel or the adjustable shaft member is released from the shaft through deactivation of the hydraulic fixing device and the adjustment is carried out through activation of the central drive of the packaging machine, an unintentional adjustment of the released drive wheel in consequence of vibrations, friction or the like can be avoided. This is achieved in an embodiment of the invention by locking the adjustable drive wheel in the position released from the shaft using a holding device. Brake shoes engaging the drive wheel or locking pins can be used for this purpose.

An embodiment is described in more detail below with reference to the drawing.

DESCRIPTION OF THE PREFERRED EMBODIMENT

Figure 1:
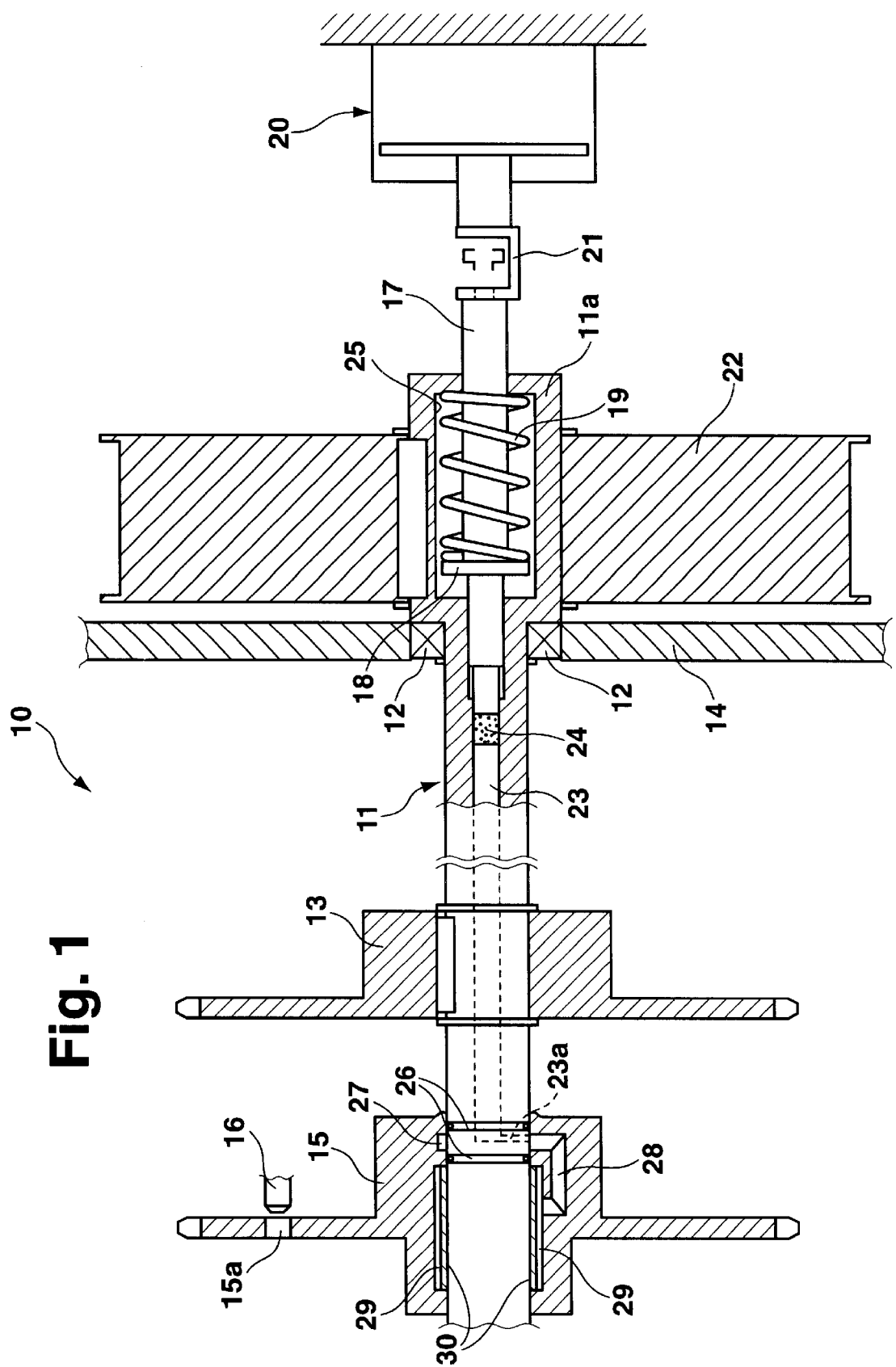
FIG. 1 shows a longitudinal cut through a shaft of a transport device of a packaging machine in accordance with a first embodiment.

FIG. 1 shows a shaft 11 of a transport device 10 of a packaging machine, wherein the shaft 11 is borne for rotation via a bearing 12 in a housing wall 14. Additional bearings for the shaft 11 are not shown in FIG. 1. Two drive wheels in the form of chain wheels 13 and 15 of a bulk product chain or folded container chain are borne on the shaft 11. The chain wheel 13 is firmly connected to the shaft 11, whereas the chain wheel 15 is fixed in the axial direction to the shaft 11, but rotates with respect thereto.

A pulley 22 is fixed at the outer side of the housing wall 14 on a widened section 11a of the shaft 11 over which a belt (not shown) travels. A spring chamber 25 is formed in the widened section 11a of the shaft 11 into which a hydraulic channel 23, traveling in the axial direction of the shaft 11, feeds. A piston 17 extends through the spring chamber 25 from the outer side of the axial end of the shaft 11 and into the hydraulic channel 23, and a seal 24 is disposed on the front end of the piston 17 engaging into the hydraulic channel 23. A spring 19 is supported at one end by a collar 18 formed on the piston 17 within the spring chamber 25 and seats at its opposite end on the axial wall of the spring chamber. The spring 19 exercises a biasing force on the piston 17 towards the hydraulic chamber 23, i.e. in accordance with FIG. 1, to the left. The piston is connected via a bracket 21 to the hydraulic unit 20 at its outer free end the operation of which allows the piston 17 to be displaced, in accordance with FIG. 1, towards the right in opposition to the force of the spring 19.

The hydraulic channel 23 extends axially through the shaft 11 into the region of the adjustable chain wheel 15. It feeds at this location via a radial bore 23a into a ring channel 27 formed in the chain wheel 15 which is axially sealed on both sides by a ring seal 26 mounted on the shaft. The ring channel 27 is connected to a ring chamber 29 via a connection channel 28 which is likewise formed in the chain wheel 15. A membrane 30 extends between the surface of the shaft 11 and the ring chamber 29 and is pushed against the surface of the shaft 11 when an increased pressure is introduced into the ring chamber 29.

In order to be able to block the chain wheel 15 against rotation, a bore hole 15a is formed therein into which a locking pin 16 can be introduced.

In the normal operating state of the packaging machine, the spring 19 exercises a force on the piston 17 via the collar 18 as result of which same subjects the hydraulic oil present in the hydraulic channel 23 to pressure. This pressure is also present, via the radial bore 23a, the ring channel 27 and the connection channel 28, in the ring chamber 29, as result of which the membrane 30 is pressed against the shaft 11 so that the chain wheel 15 is held to the shaft and rotates along therewith. In order to be able to change the relative position between the chain wheels 13 and 15, the locking pin 16 is initially introduced into the bore hole 15a of the chain wheel 15 to hold same stationary. The hydraulic unit is then activated to displace the piston 17, in opposition to the force of the spring 19, towards the right in accordance with FIG. 1 so that the pressure in the hydraulic channel 23 and thereby in the ring chamber 29 is reduced to release the pressure between the membrane 30 and the outer surface of the shaft 11. Activation of the central drive of the packaging machine can thereby rotate the shaft 11 together with the chain wheel 13 mounted rigidly thereto, whereas the releasable chain wheel 15 remains stationary due to engagement of the locking pin 16 in the bore hole 15a. In this manner, there is a change in the relative piston between the chain wheels 13 and 15 such that they can be adjusted to a new format of the bulk product and/or the packaging.

After the adjustment motion has ended, the hydraulic unit 20 is deactivated and the piston 17 returns back into its normal position due to the force of the spring 19. The hydraulic pressure in the hydraulic channel 23 and the ring chamber 29 is increased to a sufficient extent that the membrane 30 pushes against the shaft 11 to fix the chain wheel 15 thereon. After the locking pin 16 has been pulled out of the bore hole 15a, the adjustment procedure is ended.

Figure 2:
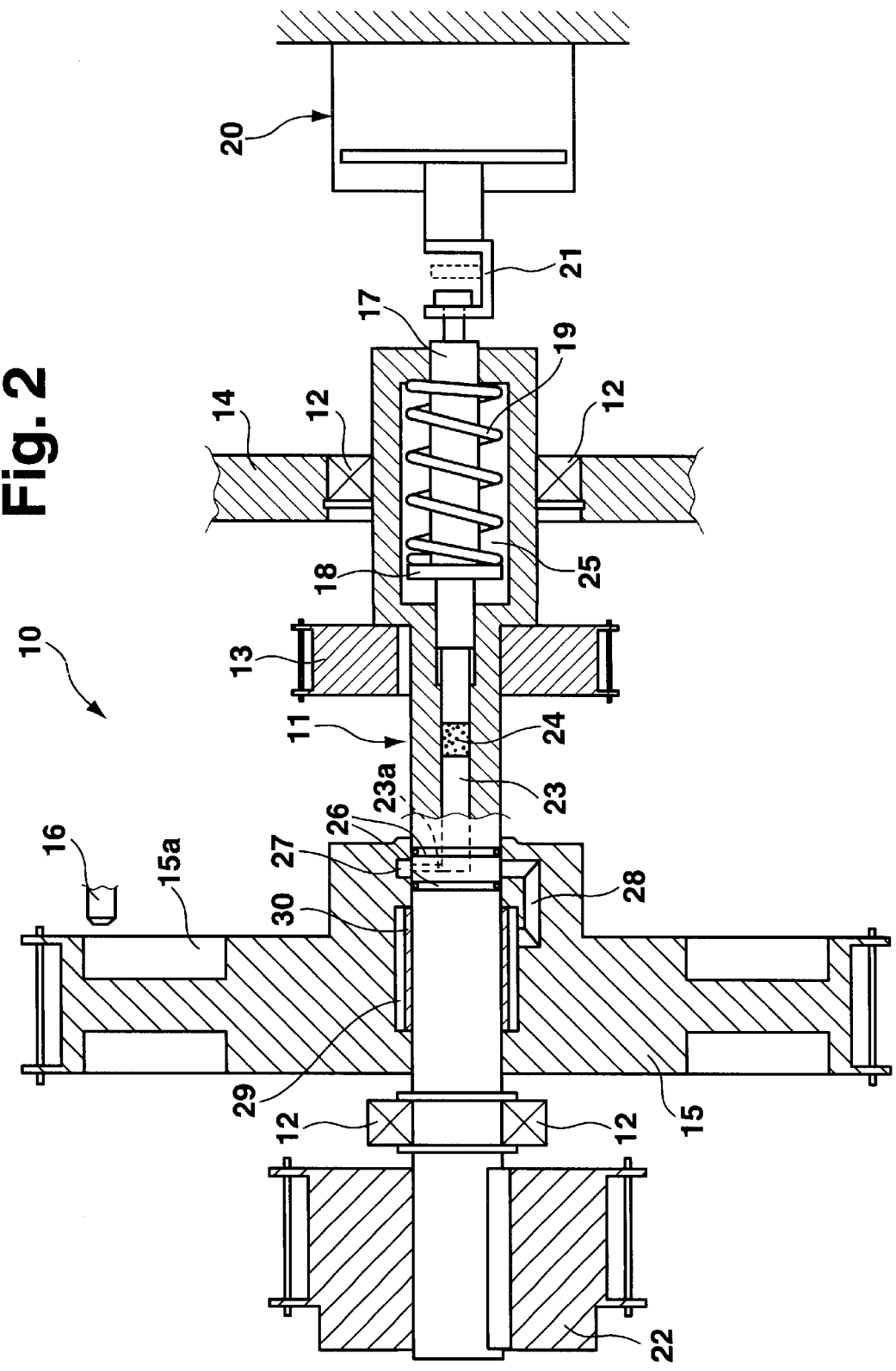
FIG. 2 shows a representation of a second embodiment corresponding to FIG. 1.

The embodiment shown in FIG. 2 has the same basic design as the embodiment in accordance with FIG. 1, wherein identical or similar components are given reference symbols corresponding to those of FIG. 1. In the configuration in accordance with FIG. 2, an adjustable pulley 15 has a construction which has already been described in connection with FIG. 1 with regard to the similar chain wheel 15. Two additional pulleys 13 and 22 are fixed to the shaft 11. These could e.g. be the drive wheel for the brochure folding apparatus and the drive wheel for the brochure clasp chain. Since both these pulleys 13 and 22 are firmly connected to the shaft 11, they maintain their relative positions even when the shaft 11 is adjusted relative to the pulley 15 so that a synchronous drive of the units coupled to the pulleys 13 and 22 is guaranteed after format adjustment.

Figure 3:
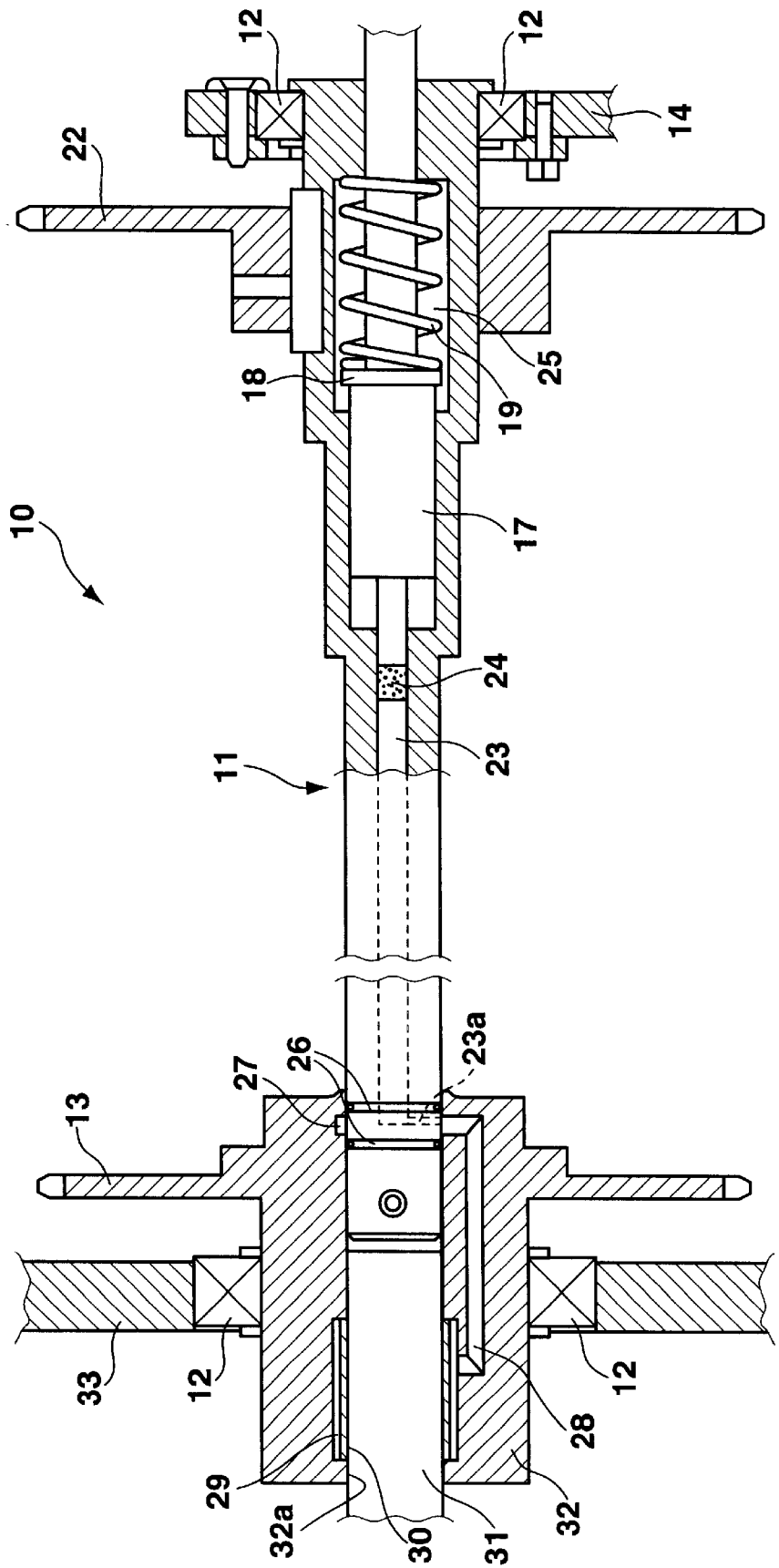
FIG. 3 shows a third embodiment in a representation corresponding to that of FIG. 1.

Whereas in the embodiments in accordance with FIGS. 1 and 2 a chain wheel and a pulley respectively are directly fixed to the shaft, in accordance with FIG. 3, an alternative embodiment provides for two coaxial shaft members 11 and 31 which can be adjusted with respect to each other. Also in FIG. 3, components which have already been described in connection with FIG. 1 are designated with corresponding reference symbols.

The first shaft member 11 accepts the piston 17 with the associated spring 19 at its, in accordance with FIG. 3, right end in a manner already described and supports an adapter sleeve 32 at its opposite, in accordance with FIG. 3, left end which is fixed to the shaft member 11 and has an additional chain wheel 13 disposed thereon. The adapter sleeve 32 is borne for rotation in a housing member 33 together with the shaft member 11 via bearing 12.

One end of an additional shaft member 31 can be introduced into an opening 32a of the adapter sleeve 32 in such a fashion that both shaft members 11 and 31 are disposed coaxially with respect to each other, wherein the shaft member 31 can rotate in the adapter sleeve 32. The axial hydraulic channel 23 fashioned in the shaft member 11 is connected to a ring chamber 29 of the adapter sleeve 32 in the manner described above and has an associated peripheral membrane 30. When the hydraulic pressure in the ring chamber 29 is increased, the membrane 30 can be pressed against the outside of the additional shaft member 31 as result of which both shaft members 11 and 31 are firmly connected to each other and turn as a unit during normal operation of the packaging machine.

For format adjustment, the fixing force introduced by the membrane 30 is reduced so that the shaft member 11 can be rotated relative to shaft member 31. After the desired adjusting position as been reached, the two shaft members 11 and 31 are once more firmly connected by increasing the pressure in the ring chamber 29.

We claim:

1. A transport device in a packaging machine comprising:
   a first endless circulating transport means;
   a second endless circulating transport means;
   a first drive wheel for driving said first transport means;
   a second drive wheel for driving said second transport means;
   a first shaft member for bearing said first drive wheel;
   a second shaft member for bearing said second drive wheel; and
   a hydraulic fastening and releasing device cooperating with said first shaft member, said hydraulic device disengaging said first shaft member for rotating said first drive wheel to an adjusted peripheral position relative to said second drive wheel, said hydraulic device engaging said first shaft member when said first drive wheel is in said adjusted peripheral position to fix said adjusted peripheral position of said first drive wheel relative to said second drive wheel and to rotate said first drive wheel along with said second drive wheel at said fixed adjusted peripheral position.

2. The device of claim 1, wherein at least one of said first and said second transport means comprises a transport chain and at least one of said first and said second drive wheels comprises a chain wheel.

3. The transport device claim 1, wherein at least one of said first and said second transport means comprises a toothed belt and at least one of said first and said second drive wheels comprises a pulley.

4. The device of claim 1, wherein said said first and said second shaft member form a common continuous shaft and at least one of said first and said second drive wheels is radially fixed to said continuous shaft by said hydraulic fastening device.

5. The device of claim 1, wherein said first and said second shaft members are coaxial, and said hydraulic fastening device and said releasing device for adjusting a peripheral direction of said first and said shaft members with respect to each other and for fixing said first and said second shaft members relative to each other.

6. The device of claim 1, wherein said hydraulic fastening device comprises a pressure loaded piston and a hydraulic channel feeding into a pressure chamber, wherein said pressure chamber has an associated fastening element to press against at least one of said first and said second shaft members in response to a pressure in said pressure chamber.

7. The device of claim 1, further comprising a holding device to lock at least one of said first and said second drive wheels into a position released from at least one of said first and said second shaft members.

8. The device of claim 5, wherein said hydraulic fastening device comprises a pressure loaded piston and a hydraulic channel feeding into a pressure chamber, wherein said pressure chamber has an associated fastening element to press against at least one of said first and said second shaft members in response to a pressure in said pressure chamber.

9. The device of claim 6, wherein said pressure chamber is formed in at least one of said first and said second drive wheels.

10. The device of claim 6, wherein said hydraulic channel extends axially in at least one of said first and said second shaft members.

11. The device of claim 6, wherein said piston is loaded by a spring.

12. The device of claim 8, wherein said pressure chamber is formed in at least one of said first and said second drive wheels.

13. The device of claim 8, further comprising an adapter sleeve coaxially accepting said first and said second shaft members and fixed to one of said first and said second shaft members, wherein said pressure chamber is formed in said adapter sleeve.

14. The device of claim 8, wherein said pressure chamber is a ring chamber surrounding one of said first and said second shaft members.

15. The device of claim 8, wherein said fastening element comprises a membrane separating said pressure chamber from at least one of said first and said second shaft members.

16. The device of claim 8, wherein said hydraulic channel extends axially in at least one of said first and said second shaft members.

17. The device of claim 11, wherein said spring is disposed in a spring chamber formed in one of said first and said second shaft members.

18. The device of claim 13, wherein one of said first and said second drive wheels is mounted on said adapter sleeve.

19. A transport device in a packaging machine comprising:
   a first endless circulating transport means;
   a second endless circulating transport means;
   a first drive wheel for driving said first transport means;
   a second drive wheel for driving said second transport means;
   a first shaft member for bearing said first drive wheel;
   a second shaft member for bearing said second drive wheel; and
   a hydraulic fastening and releasing device cooperating with said first shaft member, said hydraulic device disengaging said first shaft member for rotating said first drive wheel to an adjusted peripheral position relative to said second drive wheel, said hydraulic device engaging said first shaft member when said first drive wheel is in said adjusted peripheral position to fix said adjusted peripheral position of said first drive wheel relative to said second drive wheel and to rotate said first drive wheel along with said second drive wheel at said fixed adjusted peripheral position, wherein said hydraulic fastening device comprises a pressure loaded piston and a hydraulic channel feeding into a pressure chamber, wherein said pressure chamber has an associated fastening element to press against at least one of said first and said second shaft members in response to a pressure in said pressure chamber, wherein said pressure chamber is a ring chamber surrounding one of said first and said second shaft members.

20. A transport device in a packaging machine comprising:

a first endless circulating transport means;

a second endless circulating transport means;

a first drive wheel for driving said first transport means;

a second drive wheel for driving said second transport means;

a first shaft member for bearing said first drive wheel;

a second shaft member for bearing said second drive wheel;

a hydraulic fastening and releasing device cooperating with said first shaft member, said hydraulic device disengaging said first shaft member for rotating said first drive wheel to an adjusted peripheral position relative to said second drive wheel, said hydraulic device engaging said first shaft member when said first drive wheel is in said adjusted peripheral position to fix said adjusted peripheral position of said first drive wheel relative to said second drive wheel and to rotate said first drive wheel along with said second drive wheel at said fixed adjusted peripheral position, wherein said hydraulic fastening device comprises a pressure loaded piston and a hydraulic channel feeding into a pressure chamber, wherein said pressure chamber has an associated fastening element to press against at least one of said first and said second shaft members in response to a pressure in said pressure chamber, wherein said fastening element comprises a membrane separating said pressure chamber from at least one of said first and said second shaft members.

* * * * *